United States Patent
Nainar et al.

(10) Patent No.: US 10,270,691 B2
(45) Date of Patent: Apr. 23, 2019

(54) SYSTEM AND METHOD FOR DATAPLANE-SIGNALED PACKET CAPTURE IN A SEGMENT ROUTING ENVIRONMENT

(71) Applicant: Cisco Technology, Inc., San Jose, CA (US)

(72) Inventors: Nagendra Kumar Nainar, Morrisville, NC (US); Richard Furr, Fredericksburg, VA (US); Carlos Pignataro, Raleigh, NC (US); Joseph Michael Clarke, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 15/056,502

(22) Filed: Feb. 29, 2016

(65) Prior Publication Data
US 2017/0250908 A1    Aug. 31, 2017

(51) Int. Cl.
| | |
|---|---|
| *H04L 12/741* | (2013.01) |
| *H04L 12/715* | (2013.01) |
| *H04L 12/46* | (2006.01) |
| *H04L 12/723* | (2013.01) |

(52) U.S. Cl.
CPC .......... *H04L 45/74* (2013.01); *H04L 12/4633* (2013.01); *H04L 12/4641* (2013.01); *H04L 45/50* (2013.01); *H04L 45/64* (2013.01)

(58) Field of Classification Search
CPC ....................................................... H04L 45/50
See application file for complete search history.

(56) References Cited

U.S. PATENT DOCUMENTS

| | | |
|---|---|---|
| 7,626,938 B1 | 12/2009 | Orr et al. |
| 2002/0026525 A1 | 2/2002 | Armitage |
| 2005/0147050 A1 | 7/2005 | Klink |
| 2011/0080835 A1 | 4/2011 | Malomsoky et al. |
| 2011/0222412 A1 | 9/2011 | Kompella |
| 2014/0086253 A1 | 3/2014 | Yong |
| 2014/0177428 A1 | 6/2014 | Sinha et al. |
| 2015/0016245 A1 | 1/2015 | Ra et al. |

(Continued)

FOREIGN PATENT DOCUMENTS

WO    2015/165212    11/2015

OTHER PUBLICATIONS

Raza, K. et al., "IPv6 Router Alert Option for MPLS Operations, Administration, and . Maintenance (OAM)," Internet Engineering Task Force (IETF), Apr. 2015, 6 pages.

(Continued)

*Primary Examiner* — Shukri Taha
(74) *Attorney, Agent, or Firm* — Meunier Carlin & Curfman LLC (57) ABSTRACT

Presented herein are segment-routing methods and systems that facilitate data plane signaling of a packet as a candidate for capture at various network nodes within a segment routing (SR) network. The signaling occurs in-band, via the data plane—that is, a capture or interrogation signal is embedded within the respective packet that carries a user traffic. The signaling is inserted, preferably when the packet is classified, e.g., at the ingress node of the network, to which subsequent network nodes with the SR network are signaled to capture or further inspect the packet for capture.

16 Claims, 10 Drawing Sheets

(56) References Cited

U.S. PATENT DOCUMENTS

2017/0111230 A1* 4/2017 Srinivasan .............. H04L 41/12
2017/0155592 A1 6/2017 Chen

OTHER PUBLICATIONS

International Search Report and Written Opinion, dated Jun. 27, 2017, issued in connection with International Patent Application No. PCT/US2017/019857.

* cited by examiner

SYSTEM AND METHOD FOR DATAPLANE-SIGNALED PACKET CAPTURE IN A SEGMENT ROUTING ENVIRONMENT

TECHNICAL FIELD

The present disclosure relates to the servicing of packets within segment routing networks, specifically, the signaling of packets for capture.

BACKGROUND

Segment routing (SR) is a type of underlay network that helps realize various overlay technologies. In a SR network, a node (i.e., at an ingress of the network) can steer a packet using a controlled set of instructions, called segments, by prepending a header of segments to the packet. A segment can represent any instructions, topological or service-based (e.g., instructions may include, for example, but not limited to, a destination address, a service, a context, a locator, a local value or a global value, as well as a forwarding construct such as an IGP-based or BGP-based forwarding construct). Interior gateway protocol (IGP) is a type of protocol used for exchanging routing information between gateways (e.g., routers) within an autonomous system (AS). Border Gateway Protocol (BGP) is another protocol designed to exchange routing and reachability information among autonomous systems on the Internet.

A segment may include a segment identifier; the two terms are interchangeably used herein. Multiple segments are combined to form an order list of instructions, the order list is also referred to as a stack (of segment identifiers).

In certain circumstances, it is desired to capture packets in a SR traffic flow, for example, by network administrators, for analysis—such as to identify applications operating on a given SR network; identify points of intrusions to identify security flaws and breaches; identify data leakages; troubleshoot occurrences of undesired network events; identify and/or recover lost or stolen data and packets; determine extent of network elements comprised by virus and malware; assess impact of changes within a network; and ensure long-term compliance issues.

DESCRIPTION OF EXAMPLE EMBODIMENTS

Overview

Presented herein are segment-routing methods and systems that facilitate data plane signaling of a packet as a candidate for capture at various network nodes within a segment routing network. The signaling occurs in-band, via the data plane—that is, a capture or interrogation signal is embedded within the respective packet (e.g., in the packet header) that carries a user traffic. The signaling is inserted, preferably when the packet is classified, e.g., at the ingress node of the network, to which subsequent network nodes with the SR network are signaled to capture or further inspect the packet for capture.

Example Embodiments

As a part of traffic analysis, monitoring, and troubleshooting of a SR network, a network administrator or operator may have a need or desire to capture packet flow for a given segment of the network. To do so may require, for example, the capture of all traffic on a given interface. With the introduction of 100 G and 400 G links, it is not practically scalable to capture such flows. In addition, while control and data-plane elements are well understood, it is not currently possible to have full visibility of a packet at multiple points within an IPv6 network without deploying, at each of the points, a packet sniffer and protocol analyzer synchronized to one another or defining a complex filters to determine a packet for capture.

According to an aspect, a method in a segment-routing (SR) network (e.g., a SR cloud that includes an IPv6, or MPLS network) is disclosed. The method includes receiving, at a first network node, a packet to selectively route, according to one or more policies enforced at the first network node, to a plurality of network nodes, collectively, forming the segment routing network; receiving, at the first network node, one or more packet capture policies; and generating, at the first network node, a segment routing (SR) packet to transmit to a network node in the segment routing network, the SR packet having a stack of one or more segment identifiers, wherein the stack encapsulates the received packet, and wherein at least one of the segment identifier within the stack includes a capture instruction to signal, to at least one network node of the plurality of network nodes, payload of the SR packet as a candidate for capture.

In some embodiments, the method includes determining, by a processor of the first network node, based on the one or more packet capture policies, one or more network nodes to capture the SR packet. In some embodiments, the one or more capture policies are selected from the group consisting of per-flow capture, per-VPN (per-Virtual Private Network session) capture, interface type capture, time capture, and packet count capture.

In some embodiments, upon receiving, at a given network node, a given SR packet, the given network node is configured to scan the stack to determine presence of a capture instruction, and wherein, upon the capture instruction being determined to be present, the given network node is configured to capture the SR packet by: locally storing the SR packet in a memory of the given network node, or generate and forward a copy of the SR packet to a network node having an inspection, capture, or storage function. In some embodiments, the node may establish a MPLS (multi-protocol label stack) tunnel to a remote computing device.

In some embodiments, the given network node is configured to scan the stack at a current segment identifier for presence of the capture instruction, the given network node capturing the SR packet when the capture instruction is present at the current segment identifier. In some embodiments, the stack includes a plurality of capture segment identifiers, each having a capture instruction.

In some embodiments, the given network node is configured to scan the stack at a last segment identifier for presence of the capture instruction, the given network node capturing the SR packet when the capture instruction is present at the last segment identifier. In some embodiments, an egress node in the SR network is configured to remove the last segment identifier from the SR packet.

In some embodiments, the given network node is configured to scan all the segment identifiers of the stack for presence of the capture instructions, the given network node capturing the SR packet when the capture instruction is present in any of the scanned segment identifiers.

In some embodiments, wherein upon receiving, at a transit node, a given SR packet, the transit node is configured to i) scan the stack for a current segment identifier within the stack to determine a next forwarding network node and any intermediate network nodes therebetween and ii) forward a modified SR packet to the determined next network node, wherein the modified SR packet includes a modified stack of segment identifiers with the next segment identifier updated as the current segment identifier, and wherein, upon the capture instruction being determined to be present, the transit node is configured to establish a MPLS (multi-protocol label stack) tunnel to a remote computing device.

In some embodiments, wherein upon receiving, at a transit node, a given SR packet, the transit node is configured to i) scan, using a current position number of the segment identifier, a current segment identifier within the stack to determine a next forwarding network node and any intermediate network nodes therebetween, and ii) forward a modified SR packet to the determined next network node, wherein the modified SR packet includes a modified stack of segment identifiers with the current position number for the current segment identifier incremented or decremented by one, and wherein, upon the capture instruction being determined to be present, the transit node is configured to establish a MPLS (multi-protocol label stack) tunnel to a remote computing device.

In some embodiments, each of the one or more segment identifiers, collectively, is defined in an IPv6 segment routing header or a MPLS header.

In some embodiments, the segment identifier with the capture instruction includes a capture direction instruction selected from the group consisting of an ingress direction, an egress direction, and both the ingress and egress direction.

In some embodiments, the segment identifier with the capture instruction has a value assigned from a segment routing global range, the value being broadcasted, via IGP (Interior Gateway Protocol) or BGP (Border Gateway Protocol), to other network nodes in the SR network.

In some embodiments, the first network node is located at an ingress of the SR network.

In some embodiments, the plurality of network nodes comprise at least a device selected from the group consisting of a router, network addressor translation (NAT) device, an intrusion prevention system (IPS), an intrusion detection system (IDS), a deep packet inspection (DPI) device, a firewall, a switch, a computing device executing a virtual switch, a network-attached storage (NAS) device, a load balancer (LB) system, a wide-area network/local-area network (WAN/LAN) accelerator, and a computing system executing a virtual machine (VM).

According to another aspect, a method of operating a network node (e.g., a transit node) in a segment-routing (SR) network (e.g., a SR cloud, IPv6, or MPLS network) is disclosed. The method include receiving, at a network node, a SR packet, the SR packet having a packet payload encapsulated via a segment routing stack having a plurality of segment identifiers; interrogating, at the network node, the segment routing stack; and in response to a determination of a capture instruction being present in the segment routing stack, causing the SR packet to be either stored in a memory of the network node or forwarded to a remote computing device for interrogation or capture of the SR packet. In some embodiment, the remote computing device (e.g., a storage server) is assigned a node segment; the network node encapsulates the captured packet and pushes the encapsulated captured packet to the node segment to the remote computing device—whereby the packet is tunneled to the server.

In some embodiments, the method includes, in response to a determination of the capture instruction being present in the stack, i) replicating and forwarding, to the remote computing device having a packet capture and/or analysis function, the SR packet, and ii) replicating and forwarding, to a next forwarding network node identified by a current segment identifier within the stack, a modified SR packet, wherein the modified SR packet has a next segment identifier updated as the current segment identifier. In some embodiments, the current segment identifier is removed (i.e., popped) from the stack. In other embodiments, a pointer to the current segment.

In some embodiments, the network node is configured to interrogate a current segment identifier in the stack to determine presence of a capture instruction.

In some embodiments, the network node is configured to interrogate a last segment identifier in the stack to determine presence of a capture instruction.

In some embodiments, the network node is configured to interrogate all segment identifiers in the stack to determine presence of a capture instruction.

According to another aspect, a system for signaling a SR packet as a candidate for capture is disclosed. The system includes a processor; and a memory having instructions thereon, wherein the instructions, when executed by the processor, cause the processor to: receive a packet to selectively route, according to one or more policies enforced at the first network node, to a plurality of network nodes, collectively, forming the segment routing network; receive one or more packet capture policies; and generate a segment routing (SR) packet to transmit to a network node in the segment routing network, the SR packet having a stack of one or more segment identifiers, wherein the stack encapsulates the received packet, and wherein at least one of the segment identifier within the stack includes a capture instruction to signal, to at least one network node of the plurality of network nodes, payload of the SR packet as a candidate for capture.

As used herein, processor refers to a physical hardware device that executes encoded instructions for performing functions on inputs (e.g., from a network interface) and creating outputs (e.g., for an output network interface).

According to another aspect, a non-transitory computer readable medium is disclosed. The computer readable medium includes instructions, wherein the instructions, when executed by a processor of a computing device, cause the processor to: receive a packet to selectively route, according to one or more policies enforced at the first network node, to a plurality of network nodes, collectively, forming the segment routing network; receive one or more packet capture policies; and generate a segment routing (SR) packet to transmit to a network node in the segment routing network, the SR packet having a stack of one or more segment identifiers, wherein the stack encapsulates the received packet, and wherein at least one of the segment identifier within the stack includes a capture instruction to signal, to at least one network node of the plurality of network nodes, payload of the SR packet as a candidate for capture.

According to another aspect, a non-transitory computer readable medium is disclosed. The computer readable medium includes instructions, wherein the instructions, when executed by a processor of a computing device, cause the processor to: receive a SR packet, the SR packet having a packet payload encapsulated via a segment routing stack having a plurality of segment identifiers; interrogate the segment routing stack; and in response to a determination of a capture instruction being present in the segment routing stack, cause the SR packet to be either stored in a memory of the network node or forwarded to a remote computing device for interrogation or capture of the SR packet.

Segment Routing Network

Figure 1:
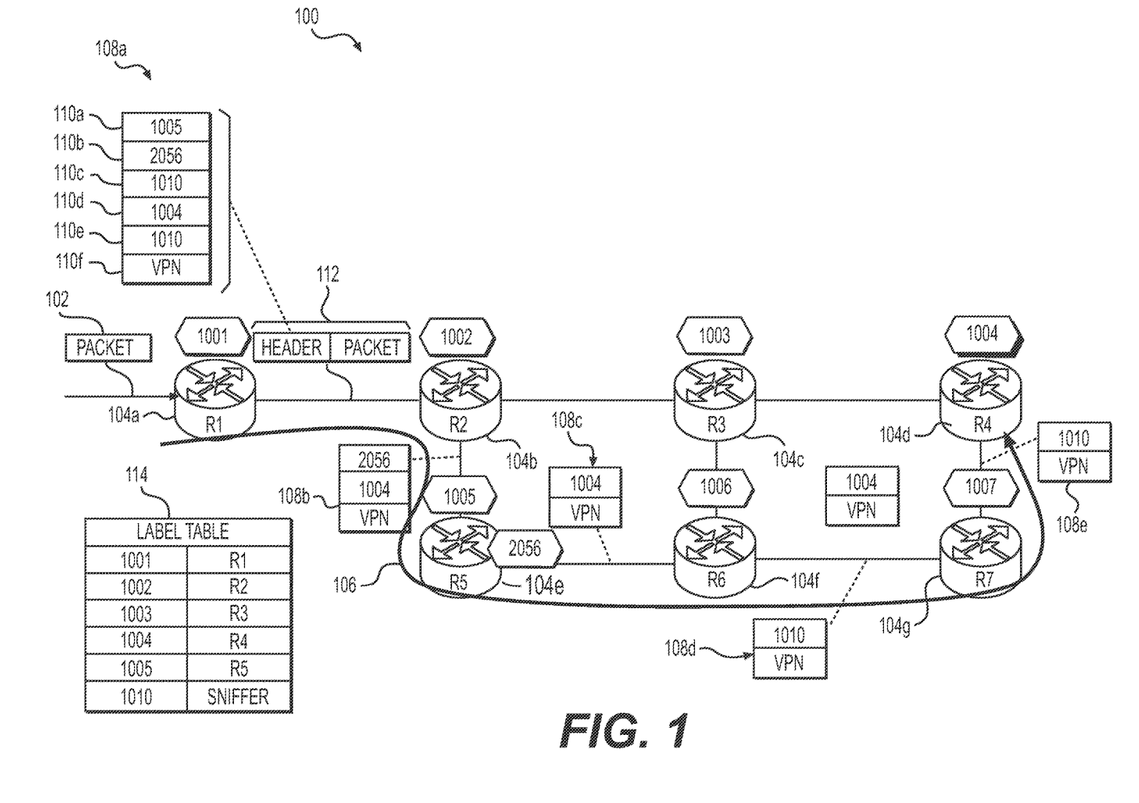
FIG. 1 is a diagram illustrating an example segment routing network in which a segment routing (SR) packet is signaled as a candidate for capture at one or more nodes within the segment routing network, in accordance with an illustrative embodiment.

FIG. 1 is a diagram illustrating an example segment routing (SR) network 100 in which a packet is signaled as a candidate for capture or interrogation (e.g., via deep packet inspection) at one or more nodes within the network, in accordance with an illustrative embodiment. As shown, the SR network is implemented in an SR cloud which provides an underlay network service for payloads such as L2 frames (EVPN "Ethernet VPN", NVO3 "network virtualization overlays", among others) or IPv4/IPv6 VPN service. A SR network is also referred to as a segment routing domain (SR Domain) and include a set of nodes participating into the source based routing model. These nodes may be connected to the same physical infrastructure (e.g.: a service provider's network) as well as nodes remotely connected to each other (e.g., an enterprise VPN or an overlay).

To capture a packet (e.g., to determine specific flow) in the SR cloud, the ingress node of the SR cloud inserts a segment identifier to the segment stack (e.g., in a segment routing header) to signal to other nodes in the SR network (to which, and through which, the SR packet is forwarded) to interrogate or capture the SR packet. The signaling allows the respective nodes in the SR network to determine a given SR packet as a candidate for capture without the use of capture filters.

In some embodiments, a domain wide unique label is assigned by an operator and advertised via IGP to all nodes including the ingress node. In some embodiments, the domain wide unique label, which is defined from a global SR range, say a "Sniffer-Label" and has the forward semantic (or associated instruction) of "CAPTURE and CONTINUE". The ingress node to the SR network, in some embodiments, is configured to instruct forwarding policy, which includes the sniffer label, in addition to any forwarding segment. Correspondingly, the transit node is configured to take a snap shot of the packet and storing the snapshot locally or forwarding the packet to a capture node to take the snap shot of the packet. In some embodiments, the transit node may establish a MPLS (multi-protocol label stack) tunnel to a remote computing device. The transit node may perform the capture at the ingress of the packet at the node, at the egress of the packet at the node, or at both the ingress and egress (after header rewrite) direction at the node.

Referring now to FIG. 1, the SR network 100 includes a plurality of network nodes 104 (e.g., routers, shown as nodes "R1" 104*a*, "R2" 104*b*, "R3" 104*c*, "R4" 104*d*, "R5" 104*e*, "R6" 104*f*, and "R7" 104*g*). A packet 102 is received at an ingress node (shown as router "R1" 104*a*) in the SR network 100. The ingress node 104*a* is configured to classify the received packet 102 and determine, according to one or more policies enforced at the node 104*a*, a route 106 across a plurality of network nodes (i.e., nodes 104*a*, 104*b*, 104*e*, 104*f*, 104*g*, and 104*d*). The route 106 is generated as an ordered list of instructions 108 (i.e., segment identifiers, shown as 108*a*, 108*b*), in which certain types of segment identifiers (e.g., 110*a*, 110*d*) identify a transit node (e.g., nodes 104*e*, 104*d*) to which a SR packet 112 is to be forwarded. In some embodiments, transit nodes (i.e., those listed in the segment identifiers) are the only nodes to scan the SR stack. Other nodes through which a packet is forwarded to the transit node may use conventional routing mechanisms (e.g., such as forwarding tables) to forward the packet to the transit node. In other embodiments, all nodes through which a SR packet is received and forwarded is a transit node and scans the segment stack.

Each node 104 in the SR network 100 maintains a mapping between the segment identifier and a type of instruction which is associated with a given node (e.g., a routing type identifier, a service type identifier, or any type of identifier). For example, as shown in FIG. 1, node "R1" 104*a* has a routing identifier of "1001" (note: each routing identifier is also referred to a IGP Prefix Segment Identifier (SID) or Node Segment Identifier (SID)); node "R2" 104*b* has a routing identifier of "1002"; node "R3" 104*c* has a routing identifier of "1003"; node "R4" 104*d* has a routing identifier of "1004"; node "R5" 104*e* has a routing identifier of "1005"; node "R6" 104*f* has a routing identifier of "1006"; and node "R7" 104*g* has a routing identifier of "1007". These routing identifiers allow a segment to designate or label a given node as a transit node to which a packet is to be forwarded without further instructions as to the routing to be performed.

In addition, node "R5" 104*e* has an adjacency segment identifier of "2056". The adjacency segment identifiers allow a segment to designate or label an extension for segment routing associated with a given node. These adjacency segment and routing identifiers are instantiated via a SR stack to allow the ingress node to direct an incoming packet to such nodes or a network services associated therewith. In some embodiments, service identifiers are used to designate or label a service associated with a given node.

In some embodiments, the mapping is implemented in a label table that is broadcasted to all nodes in the SR network. FIG. 1 provides examples of labels and their corresponding instructions, in accordance with an illustrative embodiment. As shown in FIG. 1, label table 114 includes a list (the list is non-exhaustive) of associations in which segment identifier value "1001" is a forwarding instructions to router "R1" 104a; segment identifier value "1002" is a forwarding instructions to router "R2" 104b; segment identifier value "1003" is a forwarding instructions to router "R3" 104c; segment identifier value "1004" is a forwarding instructions to router "R4" 104d; segment identifier value "1005" is a forwarding instructions to router "R5" 104e; and segment identifier value "1010" is a sniffer instruction (i.e., a capture instruction).

In some embodiments, labels are assigned from the global range, for example, to provide granularity in the capture instructions that may be executed upon, as well as to instruct a direction in which capture is to be performed (e.g., in the ingress direction of a node, at the egress direction of the node, or both directions of the node). In addition, the labels, in some embodiments, specify a type of capture action, for example, capture locally (e.g., label "1014") or forward the packet to a remote node for capture (e.g., label "1015").

TABLE 1

| | |
|---|---|
| 1010 | {Capture and continue} |
| 1011 | {Capture @ Ingress direction} + {forward} |
| 1012 | {Capture @ Egress direction} + {forward} |
| 1013 | {Capture @ both direction} + {forward} |

The assignment of the label is based, in some embodiments, on the ingress SR node matching the packet to a local policy. Transit SR nodes then react to the segment to locally store the SR packet or forward the SR packet to at a remote storage or analysis computing device (e.g., a SAN—storage area network). The associated semantic for such segments is to replicate the packet—send one to a local packet capture process and forward a second to a next transit node using the header details. The policy may be instantiated or modified by a segment routing or cloud-based controller to which the node is operatively linked and/or have been instantiated therefrom.

Remote storage or analysis server may include database that may include one or more software and/or hardware components that cooperate to store, organize, sort, filter, and/or arrange data used by controllers and/or processors.

Referring still to FIG. 1, a segment identifier allows a transit node to forward the SR packet 112 across multiple nodes in order to reach a next transit node. For example, using a current segment identifier 110a in the stack 108, node 104a directs the SR packet 112 to router "R5" 104e, across router "R2" 104b, via a single instruction "1005." In addition, each segment identifier allows a node (e.g., a service node) to execute a service associated therewith. As shown in FIG. 1, router "R5" 104e has an associated adjacent segment identifier having value of "2056". To this end, the segment stack 108, which has a first instruction 110a with a label "1005" and a second instruction 110b with a label "2056", causes the packet 112 to be forwarded to router "R2" 104b, which then forwards the packet 112 to router "R5" 104e. At router "R5" 104e, upon scanning the stack and seeing a current identifier of "2056", the router "R5" 104e services the packet 112 with a function associated with the label "2056" and then forwards the packet 112 to a next node identified in the stack 108—here, the next node is router "R4" 104d, which has a label "1004".

Any type of service function may be initiated, for example, but not limited to, network address translation (NAT), intrusion prevention, intrusion detection, firewall, storage, load balancing, network acceleration, etc.

Segment Routing Header (SRH)

In an IPv6 underlay, the SR network can use the IPv6 architecture by representing an ordered list of segments in a routing extension header. The extension header, in some embodiments, includes an ordered list of IPv6 addresses. The active segment is indicated by a pointer in the routing extension header, and the pointer is incremented upon completion of a segment.

Figure 2:
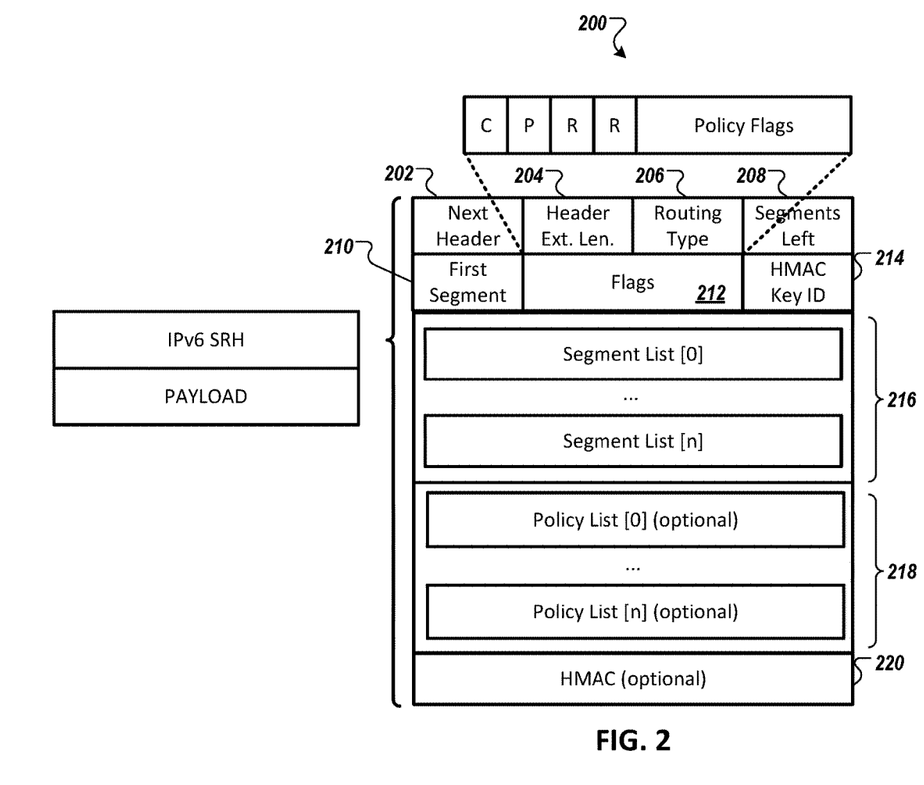
FIG. 2 illustrates an example segment routing header (SRH), which may be used, as a header for an IPv6 segment routing packet, in accordance with an illustrative embodiment

FIG. 2 illustrates an example segment routing header (SRH) 200, which may be used, as a header for an IPv6 SR packet, in accordance with an illustrative embodiment. Details of the IPv6 SR packet is found at the Internet Draft of the IPv6 Segment Routing Header (SRH) published by the International Engineering Task Force (IETF) Network Working Group, title "draft-ietf-6man-segment-routing-header-00."

As shown in FIG. 2, the proposed IPv6 Segment Routing header 200 includes a "Next Header" field 202, a "Header Extension Length" field 204, a "Routing Type" field 206, a "Segment Left" field 208, a "First Segment" field 210, a "Flag" field 212; a HMAC Key ID 214; a segment list 216; a policy list 218; and a HMAC field 220.

According to the Draft, the "Next Header" field 202 is an 8-bit selector that identifies a type of header immediately following the SRH. The "Header Extension Length" field 204 is an 8-bit unsigned integer that defines the length of the SRH header. The "Segment Left" field 208 is an index, in the segment list, of a next segment to be inspected. The "First Segment" field 210 is an index, in the segment list, of a first segment of the path which is the last element of the segment list. The "Flag" field 212 is a 16-bit flag that includes a clean-up flag 220, a protected flag 222, and policy flags 224, which defines bits 4-6 as a type of first element after the segment list, bits 7-9 as a type of second element after the segment list, bits 10-12 as a type of third element after the segment list, and bits 13-15 as a type of fourth element after the segment list. Each segment list[n] is a 128-bit IPv6 addresses representing the $n^{th}$ segment in the Segment List immediately following the SRH. The Segment List is encoded starting from the last segment of the path. The first element of the segment list (Segment List [0]) contains the last segment of the path while the last segment of the Segment List (Segment List[n]) contains the first segment of the path. The index contained in "Segments Left" identifies the current active segment. The HMAC key and field are a key-hashed message authentication code to verify the validity, the integrity and the authorization of the SRH.

In some embodiments, the segment is a 128-bit IPv6 address for a given node in the SR network.

In a MPLS (multi-protocol label stack) underlay, the SR network can use the underlying MPLS architecture without a change to the forwarding plane. An ordered list of segment identifiers may be represented as a stack of labels (i.e., a MPLS label) in which a completed segment is popped (i.e., removed) from the stack.

Figure 3:
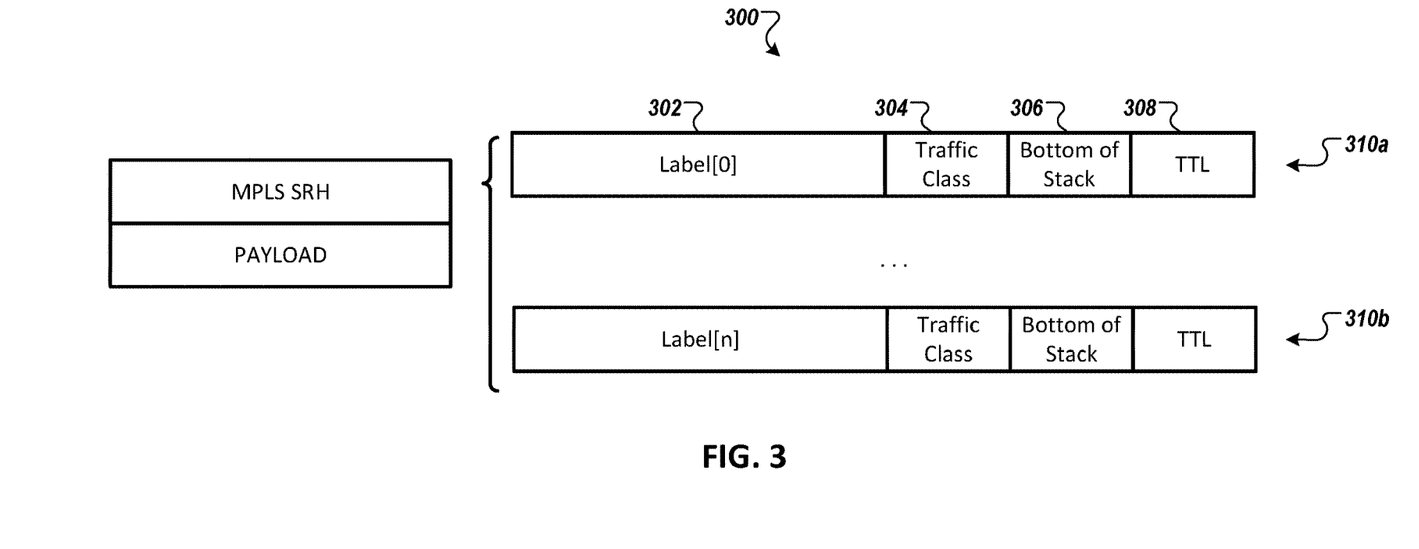
FIG. 3 illustrates an example segment routing header (SRH), which may be used, as a header for an MPLS segment routing packet, in accordance with an illustrative embodiment.

FIG. 3 illustrates an example segment routing header (SRH) 300, which may be used, as a header for an MPLS SR packet, in accordance with an illustrative embodiment.

As shown in FIG. 3, the MPLS header includes one or more segment identifiers, referred to as labels, collectively, forming a label stack. Each label (shown as label 310a and 310b) includes a label field 302, a traffic class field 304, a "bottom of stack" flag field 306, and a "time-to-live" (TTL) field 308. In some embodiment, the label field 302 is 20 bits long and identifies a router or switch assigned to the label. In some embodiment, the traffic class field 304 is a 3-bit field for quality-of-service (QoS) and explicit congestion notification (ECN). In some embodiment, the "bottom of stack" flag field 306 is a 1-bit flag that indicates that the current label is the last in the stack. In some embodiments, the TTL field 308 is 8 bits long.

Modifications of the proposed IPv6 segment routing header and MPLS segment routing header may be made without departing from the spirit of the embodiments discussed herein.

Capture Policy

Capture policy to classify a packet as a candidate for packet capture may be based on one or more classifications of a segment. The classification policy may be based on packet header field (e.g., Differentiated Services Code Point (DSCP), source address, destination address, and L4 information), incoming interface, per-VPN (i.e., per-virtual-private-network session), etc.

Figure 4:
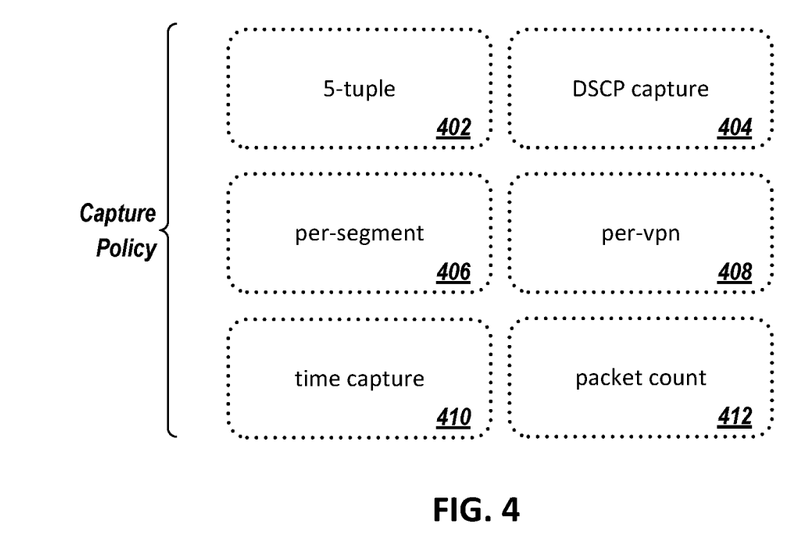
FIG. 4 depicts a diagram of capture policies for segment routing packets in a segment routing network in accordance with an illustrative embodiment.

FIG. 4 depicts a diagram of capture policies for segment routing packets in a segment routing network in accordance with an illustrative embodiment. These examples of capture policies are merely illustrative and are not provided as a limiting examples.

As shown, a first capture policy 402, in some embodiments, is based on Layer 3/4 five-tuple parameters. A classifier, running this policy 402, may signal one or more segment routing packets, as a candidate for packet capture, if the packet includes a set of one or more parameters matching a specified five-tuple classification, or a specified portion thereof—for example, a matched IP source address parameter, a matched UDP/TCP source port parameter, a matched IP destination address parameter, a matched UDP/TCP destination port parameter, and a matched protocol identifier parameter.

In addition, a second capture policy 404, in some embodiments, is based on Differentiated Services Code Point (DSCP) classification of the packet. A classifier, running this policy 404, may signal one or more segment routing packets, as a candidate for packet capture, that include a specified DSCP classification parameter.

In addition, a third capture policy 406, in some embodiments, is based on a per segment ("per-segment") basis 406. That is, specify a first node at a beginning of a segment path and a second node at an end of a segment path for a given segment identifier defined in a stack.

In addition, a fourth capture policy 408, in some embodiments, is based on a per-flow basis for a given SR path. A classifier, running this policy 408, may signal one or more SR packets as a candidate for capture based on a flow or application type (e.g., video, audio, data, VOIP).

A fifth capture policy 410 is based on a specified time window parameter. A classifier, running this policy 410, may select one or more SR packets that are specified within a time window. In some embodiments, the time window may be specified by a period of time following a specified triggered event.

A sixth capture policy 412 is based on packet counts. A classifier, running this policy 412, may select a specified number of packets (e.g., segment routing (SR) packets) for capture. The capture may be invoked following a triggered event.

Figure 5:
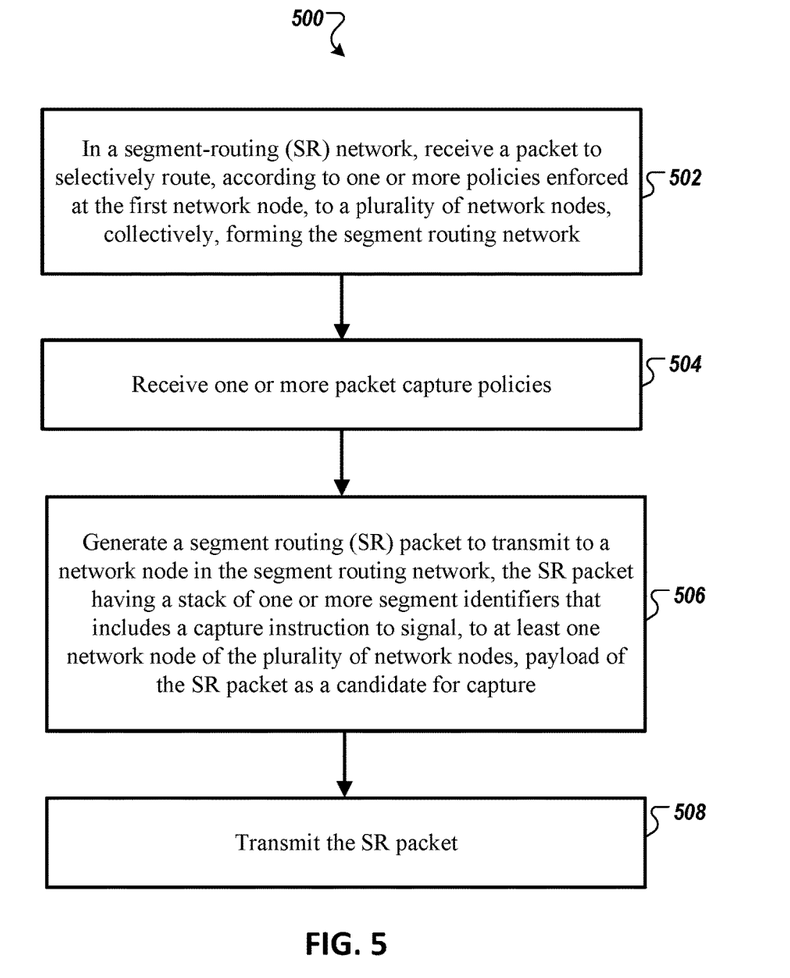
FIG. 5 depicts a flow diagram of a method of operation, for an ingress node of a network, for data plane signaling of a packet as a candidate for capture in a segment routing network in accordance with an illustrative embodiment.

FIG. 5 depicts a flow diagram of a method 500 of an operation, for an ingress node of a network, for data plane signaling of a packet as a candidate for capture, in accordance with an illustrative embodiment. The method 500 is described in relation to FIG. 1.

The method 500, at step 502, includes, in a segment-routing (SR) network (e.g., a SR cloud, IPv6, or MPLS network), receiving, at a first network node (e.g., 104a), a packet 102 to selectively route, according to one or more policies enforced at the first network node (e.g., 104a), to a plurality of network nodes (e.g., 104b-104g), collectively, forming the segment routing network.

The method 500, at step 504, includes receiving, at the first network node, one or more packet capture policies. The capture policies may be received, for example, from a SR controller or cloud-based controller operatively linked to the ingress node.

The method 500, at step 506, includes generating, at the first network node (e.g., 104a), a segment routing (SR) packet (e.g., 112) to transmit to a network node in the segment routing network 100, the SR packet (e.g., 112) having a stack (e.g., 108a) of one or more segment identifiers (e.g., 110a-110f), wherein the stack encapsulates the received packet (e.g., 102), and wherein at least one of the segment identifier (e.g., 110a-110f) within the stack includes a capture instruction (e.g., 110c, 110e) to signal, to at least one network node of the plurality of network nodes, payload of the SR packet (e.g., 112) as a candidate for capture. In some embodiments, the segment routing (SR) packet is modified where the current segment identifier is updated via next segment identifier (e.g., the current segment identifier is popped or removed from the stack; or a pointer to the current segment identifier is updated).

The method 500, at step 508, includes transmitting, at the first network node, the generated SR packet to a next network node specified by the next segment identifiers.

Figure 6:
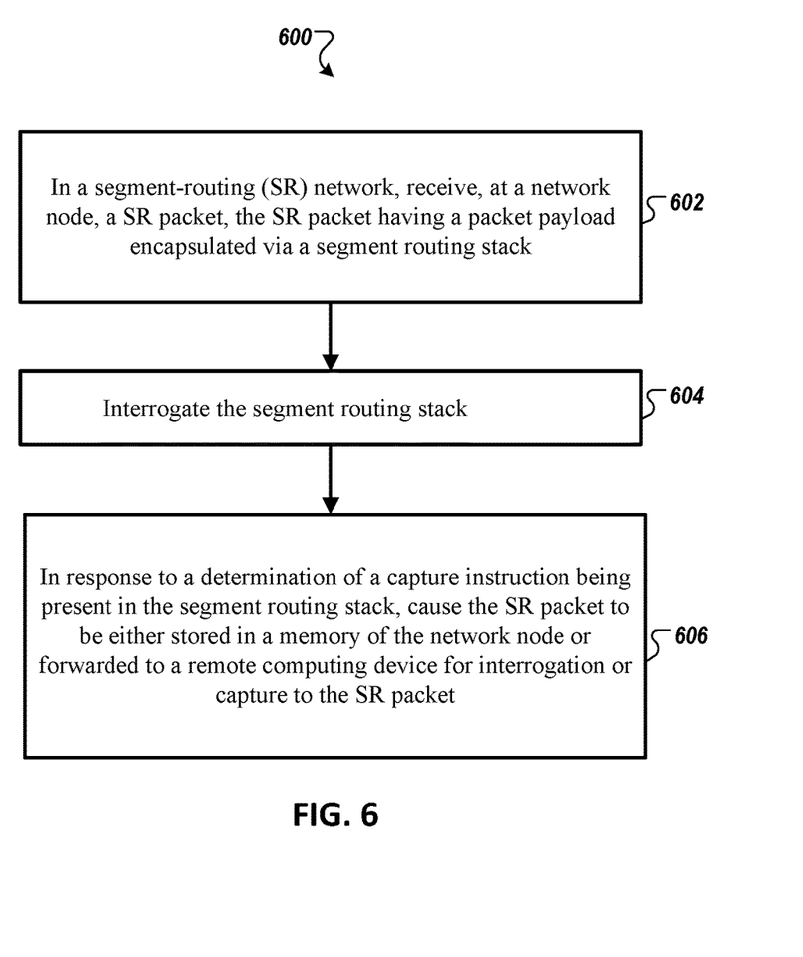
FIG. 6 depicts a flow diagram of a method of operation, for a transit node, upon receiving a segment routing packet, in accordance with an illustrative embodiment.

FIG. 6 depicts a flow diagram of a method 600 of operation, for a transit node, upon receiving a segment routing packet, in accordance with an illustrative embodiment.

The method 600, at step 602, includes receiving, at a network node, a SR packet, the SR packet having a packet payload encapsulated via a segment routing stack having a plurality of segment identifiers.

The method 600, at step 604, includes interrogating, at the network node, the segment routing stack.

The method 600, at step 606, includes, in response to a determination of a capture instruction being present in the segment routing stack, causing the SR packet to be either stored in a memory of the network node or forwarded to a remote computing device for interrogation or capture of the SR packet. In some embodiment, the remote computing device (e.g., a storage server) is assigned a node segment; the network node encapsulates the captured packet and pushes the encapsulated captured packet to the node segment to the remote computing device—whereby the packet is tunneled to the server. In some embodiments, the node may establish a MPLS (multi-protocol label stack) tunnel to a remote computing device.

Figure 7:
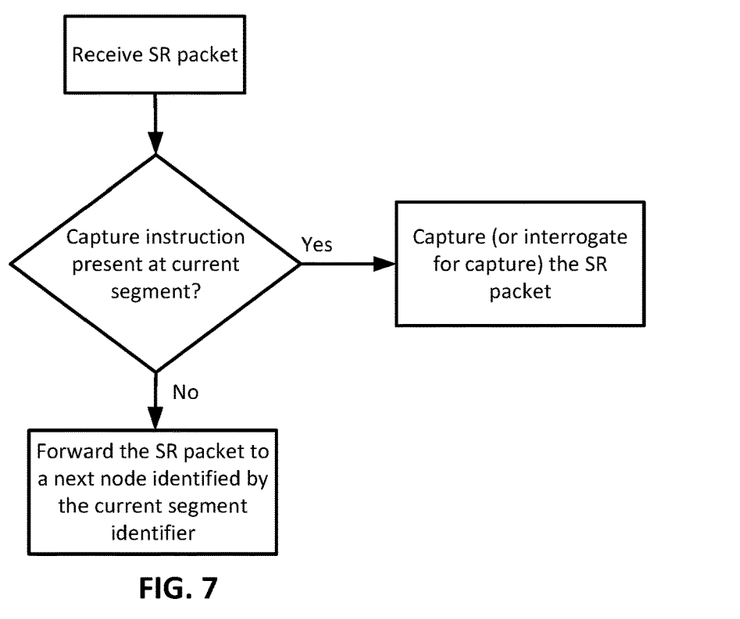
FIGS. 7-9, comprising FIGS. 7, 8, and 9, each depicts a flow diagram illustrating an interrogation operation performed by a transit node to determine a capture action (in response to receiving a SR packet).
Figure 8:
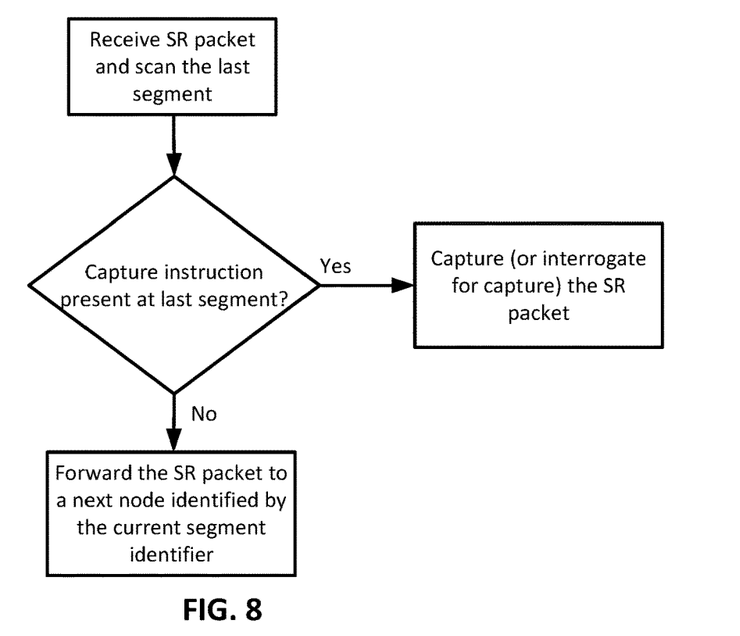
Figure 9:
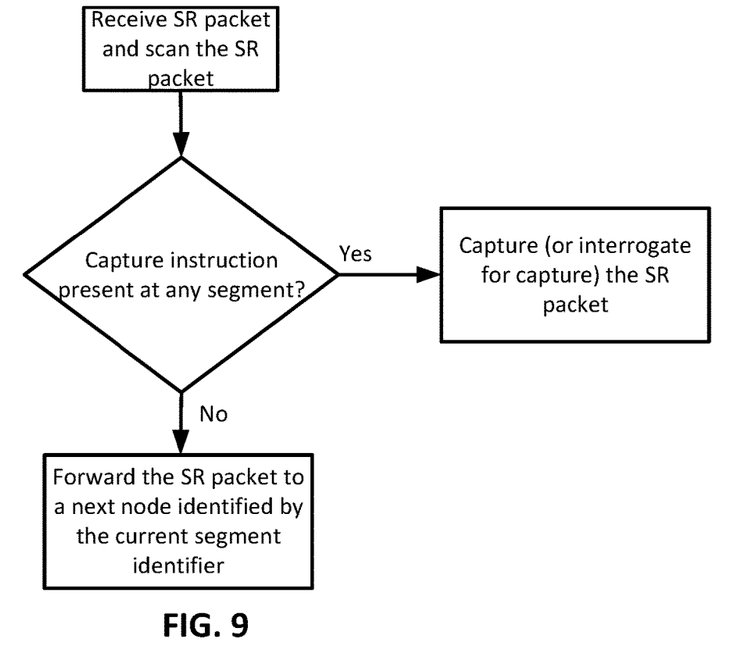

FIGS. 7-9, comprising FIGS. 7, 8, and 9, each depicts a flow diagram illustrating an interrogation operation performed by a transit node to determine a capture action (in response to receiving a SR packet).

In FIG. 7, a segment identifier with a capture instruction (e.g., a Sniffer Label) is placed at relevant segments in the segment stack. The transit node scans the current segment identifier and captures the packet only if the received current segment identifier (e.g., the top label or identifier) is a capture instruction (e.g., a Sniffer Label). In some embodiments, the transit node will POP (i.e., remove) the segment identifier (i.e., the Sniffer Label) from the stack after performing a capture process and "continue" with the forwarding action based on remaining label stack. In this configuration, each node in the SR node may be individually signaled to capture or interrogate a given SR packet.

In FIG. 8, the segment identifier (with a capture instruction, e.g., Sniffer label) is placed at the bottom or last segment of the segment stack. The transit node is configured to scan the stack (e.g., in a similar manner to Entropy Label) to determine presence of a capture instruction, though does not remove the segment identifier with the capture instructions (e.g., the Sniffer-Label) from the stack. Rather, an egress node in the SR network removes the last segment identifier prior to forwarding the packet to another network. The segment stack, in some embodiments, is established, by the ingress node, to have a segment depth that is the same or less that the maximum segment depth (MSD) of the transit node to ensure that the stack is fully scanned by a given transit node in the network.

In other embodiments, a segment identifier with the capture instructions is inserted, e.g., by the ingress node, at different position within the stack depending on the transit nodes MSD capability of the nodes in the network to ensure that each transit node finds the segment identifier with the capture instructions. In FIG. 9, the transit node is configured to scan all the segments of the SR packet and to initiate capture or interrogation of the packet for capture upon finding a segment identifier within the stack.

Figure 10:
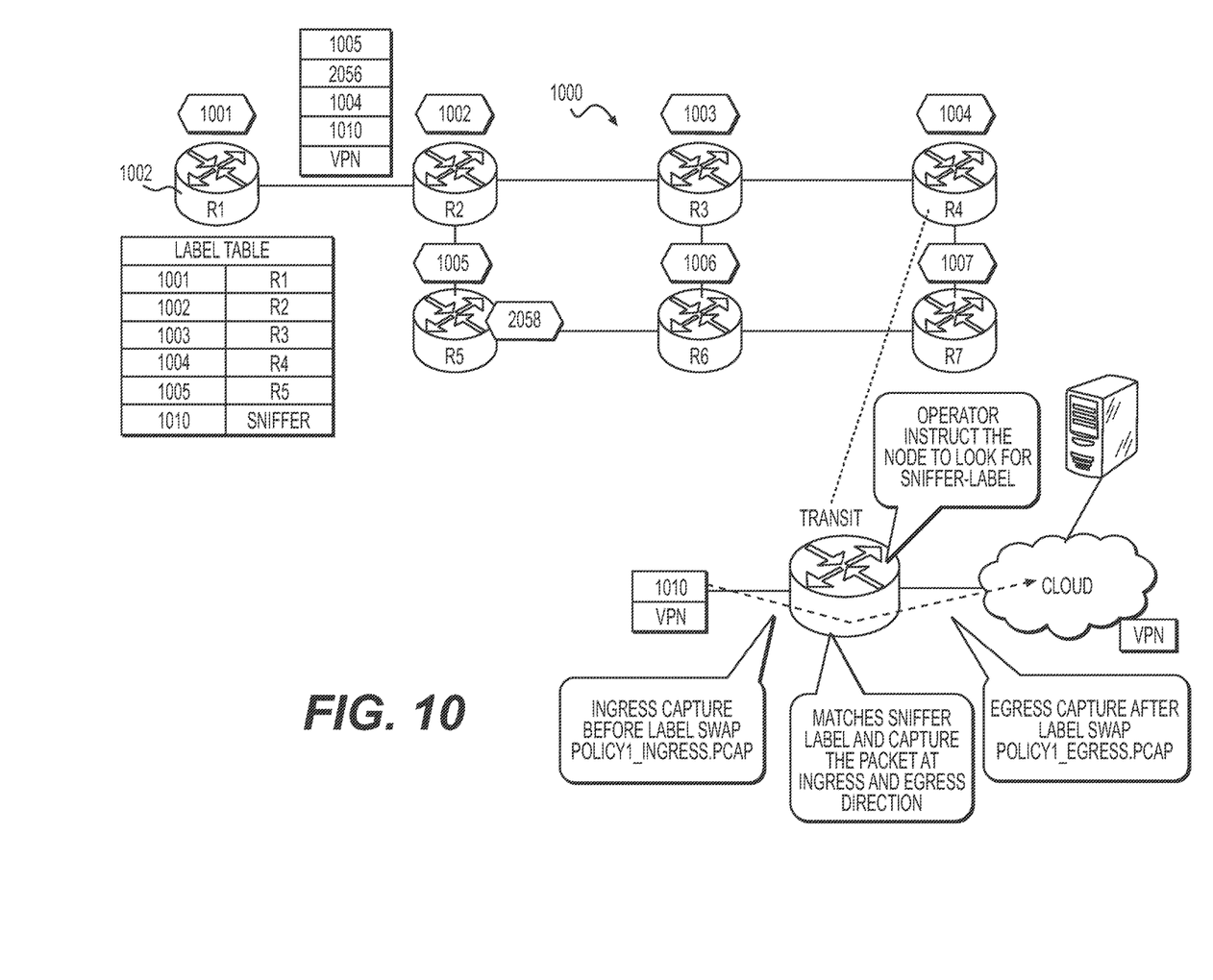
FIG. 10 is a diagram illustrating an example segment routing network in which a segment routing (SR) packet is signaled as a candidate for capture at one or more nodes within a segment routing network, in accordance with another illustrative embodiment.

FIG. 10 is a diagram illustrating an example segment routing network 1000 in which a segment routing (SR) packet is signaled as a candidate for capture at one or more nodes within the segment routing network, in accordance with another illustrative embodiment.

The ingress node (shown as router "R1" 1002) to the SR network 1000 is configured with a policy to match the incoming traffic and include segment identifier with a capture instruction (e.g., a Sniffer-label) in the segment stack. The semantic/instruction of this segment identifier (i.e., label) is to take a snapshot of the packet at both directions—namely, ingress and egress. In this topology, R1, for example, will push <1010> in addition to the existing label stack.

While all nodes are configured, in this embodiment, to check the entire stack for a segment with a capture instruction (e.g., a Sniffer-label) and then capture such packets, the operator may wish to enable the node (on an as-needed basis) to react to a segment with a capture instruction (e.g., Sniffer-label). As shown in FIG. 10, any transit node (e.g., router "R5" having the label "1005" and router "R4" having the label "1004) is enabled by the operator to scan the segment stack for all packets and perform capture if the capture instruction (e.g., Sniffer-label) is present. In some embodiments, the segment identifier with the capture instruction (e.g., Sniffer-Label) is placed in the bottom of segment stack and each transit node is configured to scan the stack thereat for the capture instruction. In other embodiments, the scan may be in a similar pattern to entropy label.

Figure 11:
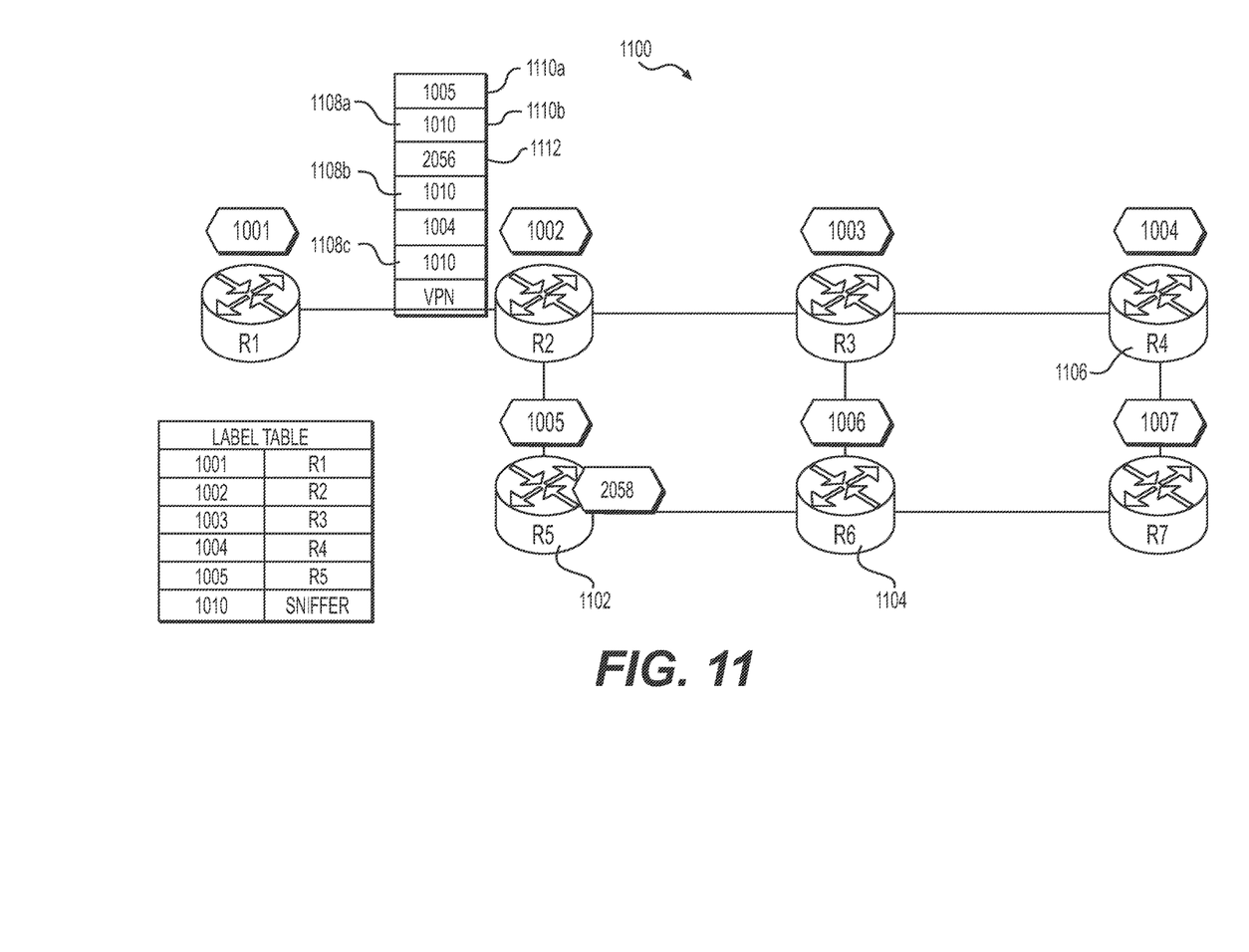
FIG. 11 is a diagram illustrating an example segment routing network in which a segment routing (SR) packet is signaled as a candidate for capture at one or more nodes within a segment routing network, in accordance with another illustrative embodiment.

In some embodiments, the segment identifier with the capture instruction (e.g., Sniffer-Label) is placed at relevant position in the segment stack and is removed by a given node when it is the current segment identifier (e.g., the top label). FIG. 11 is a diagram illustrating an example segment routing network 1100 in which a segment routing (SR) packet is signaled as a candidate for capture at one or more nodes within the segment routing network, in accordance with another illustrative embodiment. In this topology, if an operator is, for example, interested in capturing the packet at routers "R5" 1102, "R6" 1104, and "R4" 1106, the operator may include the segment identifier with the capture instruction (e.g., label stack) at defined segments (shown as 1108a, 1108b, and 1108c) corresponding to routers "R5", "R6", and "R4". As shown, at router "R2", the node will POP the segment identifier "1005" (shown as segment 1110a) to which router "R5" then receives the packet with current segment identifier (shown as segment 1110b) having a capture instruction "1010". Here, the semantic for the segment identifier is "CAPTURE, POP AND CONTINUE". To this end, the node (i.e., router "R5" 1102) captures the packet (locally or via a remote computing device), pop the segment identifier "1010" (i.e., segment 1110b) and forwards the modified SR packet to router "R6" (shown as 1104). Segment identifier "2056" is an adjacent segment identifier (shown as 1112) and is also popped. The router "R6" 1104 receives the segment identifier with the capture instruction ("1010") and so will follow the same semantic. The same happens at router "R4" 1106.

What is claimed is:

1. A method comprising:
in a segment-routing (SR) network, receiving, at a first network node, a plurality of packets each to selectively route, according to one or more policies enforced at the first network node, to a plurality of network nodes, collectively, forming the segment routing network;
receiving, at the first network node, one or more packet capture policies; and
generating, at the first network node, for each of the received plurality of packets, a segment routing (SR) packet to transmit to a network node in the segment routing network, the SR packet having a stack of one or more segment identifiers, wherein the stack encapsulates the received packet, and wherein at least one of the segment identifier within the stack includes a capture instruction to signal, via data plane signaling, to at least one network node of the plurality of network nodes, payload of the generated SR packet as a candidate for capture,
wherein a given network node of the at least one network node is configured to scan the at least one of the segment identifier within the stack for presence of the capture instruction, and wherein the given network node captures the SR packet when the capture instruction is at the at least one of the segment identifier by performing a step selected from the group consisting of (i) locally storing the SR packet in a memory of the given network node and (ii) generating and forwarding a copy of the SR packet to another network node having an inspection, capture, or storage function.

2. The method of claim 1, wherein the one or more capture policies are selected from the group consisting of per-flow capture, per-VPN (per-virtual-private-network session) capture, interface type capture, time capture, and packet count capture.

3. The method of claim 1, wherein the given network node is configured to scan the stack at a current segment identifier for presence of the capture instruction, the given network node capturing the SR packet when the capture instruction is at the current segment identifier.

4. The method of claim 3, wherein the stack includes a plurality of capture segment identifiers, each having a capture instruction.

5. The method of claim 1, wherein the at least one of the segment identifier that includes the capture instruction is located at a last segment identifier of the stack.

6. The method of claim 5, wherein an egress node in the SR network is configured to remove the last segment identifier from the SR packet.

7. The method of claim 1, wherein the given network node is configured to scan all the segment identifiers of the stack for presence of the capture instructions, the given network node capturing the SR packet when the capture instruction is present in any of the scanned segment identifiers.

8. The method of claim 1,
wherein upon receiving, at a transit node, a given SR packet, the transit node is configured to i) scan the stack for a current segment identifier within the stack to determine a next forwarding network node and any intermediate network nodes therebetween and ii) forward a modified SR packet to the determined next network node, wherein the modified SR packet includes a modified stack of segment identifiers with the next segment identifier updated as the current segment identifier, and wherein, upon the capture instruction being determined to be present, the transit node is configured to establish a MPLS (multi-protocol label stack) tunnel to a remote computing device.

9. The method of claim 1,
wherein upon receiving, at a transit node, a given SR packet, the transit node is configured to i) scan, using a current position number of the segment identifier, a current segment identifier within the stack to determine a next forwarding network node and any intermediate network nodes therebetween, and ii) forward a modified SR packet to the determined next network node, wherein the modified SR packet includes a modified stack of segment identifiers with the current position number for the current segment identifier incremented or decremented by one, and wherein, upon the capture instruction being determined to be present, the transit node is configured to establish a MPLS (multi-protocol label stack) tunnel to a remote computing device.

10. The method of claim 1, wherein each of the one or more segment identifiers, collectively, is defined in an IPv6 segment routing header or a MPLS header.

11. The method of claim 1, wherein the capture instruction includes a capture direction instruction selected from the group consisting of ingress direction, egress direction, and both ingress and egress direction.

12. The method of claim 1, wherein the segment identifier with the capture instruction has a value assigned from a segment routing global range, the value being broadcasted, via IGP (Interior Gateway Protocol) or BGP (Border Gateway Protocol), to other network nodes in the SR network.

13. The method of claim 1, wherein the first network node is located at an ingress of the SR network.

14. The method of claim 1, wherein the plurality of network nodes comprise at least a device selected from the group consisting of a router, network addressor translation (NAT) device, an intrusion prevention system (IPS), an intrusion detection system (IDS), a deep packet inspection (DPI) device, a firewall, a switch, a computing device executing a virtual switch, a network-attached storage (NAS) device, a load balancer (LB) system, a wide-area network/local-area network (WAN/LAN) accelerator, and a computing system executing a virtual machine (VM).

15. The method of claim 1, comprising:
determining, by a processor of the first network node, based on the one or more packet capture policies, one or more network nodes to capture the SR packet.

16. A system comprising:
a processor; and
a memory having instructions thereon, wherein the instructions, when executed by the processor, cause the processor to:
receive a plurality of packets each to selectively route, according to one or more policies enforced at the first network node, to a plurality of network nodes, collectively, forming the segment routing network;
receive one or more packet capture policies; and
generate for each of the received plurality of packets, a segment routing (SR) packet to transmit to a network node in the segment routing network, the SR packet having a stack of one or more segment identifiers, wherein the stack encapsulates the received packet, and wherein at least one of the segment identifier within the stack includes a capture instruction to signal, via data plane signaling, to at least one network node of the plurality of network nodes, payload of the generated SR packet as a candidate for capture,
wherein a given network node of the at least one network node is configured to scan the at least one of the segment identifier within the stack for presence of the capture instruction, and wherein the given network node captures the SR packet when the capture instruction is at the at least one of the segment identifier by performing a step selected from the group consisting of (i) locally storing the SR packet in a memory of the given network node and (ii) generating and forwarding a copy of the SR packet to another network node having an inspection, capture, or storage function.

* * * * *